United States Patent [19]
Wakeland

[11] Patent Number: 5,896,383
[45] Date of Patent: Apr. 20, 1999

[54] SYSTEM AND METHOD FOR ENCODING INSTRUCTION FIELDS WITHIN DATA PACKETS

[75] Inventor: Carl Wakeland, Austin, Tex.

[73] Assignee: Advanced Micro Devices, Inc., Sunnyvale, Calif.

[21] Appl. No.: 08/845,640

[22] Filed: May 1, 1997

[51] Int. Cl.$^6$ ............................................. H04L 12/56
[52] U.S. Cl. ........................ 370/400; 370/469; 370/466
[58] Field of Search ................................. 370/466, 469, 370/392, 401, 402, 403, 474, 476, 410, 465, 471, 400, 522; 395/849, 858

[56] References Cited

U.S. PATENT DOCUMENTS

| | | | |
|---|---|---|---|
| 5,251,205 | 10/1993 | Callon et al. | 370/392 |
| 5,339,421 | 8/1994 | Housel et al. | 395/682 |
| 5,423,002 | 6/1995 | Hart | 370/401 |
| 5,490,252 | 2/1996 | Macera et al. | 370/402 |
| 5,623,696 | 4/1997 | Johnson et al. | 395/681 |
| 5,632,016 | 5/1997 | Hoch et al. | 395/850 |
| 5,642,337 | 6/1997 | Oskay et al. | 369/30 |
| 5,687,393 | 11/1997 | Brown et al. | 395/849 |

*Primary Examiner*—Chau Nguyen
*Assistant Examiner*—Kenneth Vanderpuye
*Attorney, Agent, or Firm*—Conley, Rose & Tayon; Jeffrey C. Hood

[57] ABSTRACT

A communication system which includes more efficient packet conversion and routing for improved performance and simplified operation. The present invention includes an improved method for converting data packets between a plurality of different packet formats using a pre-defined generic packet format for simplified conversions. In order to perform a packet conversion, the method first converts a data packet having a first packet format to a the pre-defined generic packet format. The method then converts the data packet having the predefined generic packet format to a desired second different packet format. The method is thus operable to convert a data packet having any of a plurality of possible packet format types to the pre-defined generic packet format, and to convert a data packet having the pre-defined generic packet format to a data packet having any of the plurality of possible packet format types. The present invention also includes a system comprising a plurality of processors which operate to exchange packets in a common format, such as the generic format described above. In this embodiment, the system includes an instruction field comprising instructions within each of the data packets to produce instruction encoded packets. Each of the plurality of processors operate to exchange the instruction encoded packets in the common format. Each of the plurality of processors are operable to include instructions in an instruction field of a packet and to execute instructions from the instruction field comprised in the instruction encoded packets. The instructions may direct a processor to perform operations on data comprised in the instruction encoded packets or perform routing operations on the instruction encoded packets.

25 Claims, 13 Drawing Sheets

Generic Packet Format with Instruction Field

| Header | Instruction Field | Type Code | Source Address Length | Destination Address Length | Source Address | Destination Address |

| Control Field Length | Control Field | Data Field Length | Data Field | CRC Type | CRC |

FIG. 9

SYSTEM AND METHOD FOR ENCODING INSTRUCTION FIELDS WITHIN DATA PACKETS

FIELD OF THE INVENTION

The present invention relates to communication systems architectures, and more particularly to a communication system architecture which includes a generic packet format which simplifies packet conversions and enables direct transmittal of packets/frames between two or more communication controllers supporting different packet/frame formats.

DESCRIPTION OF THE RELATED ART

In today's information-based society, many individuals desire remote data connectivity to an office or remote data site. In many situations, the remote individuals desire remote and transparent connectivity to the corporate office or a remote data site, including connectivity to the corporate office local area network (LAN). In general, PC based systems and local area networks (LANs) have improved the options for remote connectivity. In general, personal computers and LANs facilitate remote access to computing resources. Remote connectivity is also made possible with the arrival of affordable, reliable, digital telecommunication services and inexpensive network hardware.

There are a number of standards used in digital telecommunications, including TCP/IP, Ethernet, HDLC, ISDN, Lap B, ATM, X.25, Frame Relay, Digital Data Service, FDDI (Fiber Distributed Data Interface, and T1, among others. Many of these standards employ different packet and/or frame formats. The term "frame" generally refers to encapsulated data at OSI layer 2, including a destination address, control bits for flow control, the data or payload, and CRC (cyclic redundancy check) data for error checking. The term "packet" generally refers to encapsulated data at OSI layer 3.

In the present application, the term packet is intended to encompass packets, frames and cells. In general, a packet format or frame format refers to how data is encapsulated with various fields and headers for transmission across a network. For example, a data packet typically includes an address destination field, a length field, an error correcting code (ECC) field or cyclic redundancy check (CRC) field, as well as headers and footers to identify the beginning and end of the packet. The terms "packet format" and "frame format", also referred to as "cell format", are generally synonymous.

In order for a router or gateway to be able to interface between communication systems employing different packet or frame formats, the router or gateway is required to perform a packet conversion to convert the data from a first packet format used by the first communication system to a second packet format used by the second communication system. As the number of possible packet formats or types increases, the amount of logic required to convert between these different packet formats also increases.

Therefore, an improved communication system and method is desired which provides more efficient packet/frame conversion between devices using different packet /frame formats.

SUMMARY OF THE INVENTION

The present invention comprises a communication system which includes more efficient packet conversion and routing for improved performance and simplified operation.

The present invention includes an improved method for converting data packets between a plurality of different packet formats. The method of the present invention uses a pre-defined generic packet format for simplified conversions. In order to convert a data packet from a first packet format to a second packet format, the method of the present invention first converts the data packet having the first packet format to a data packet having the predefined generic packet format. The method then converts the data packet having the predefined generic packet format to a data packet having the second packet format.

The method is thus operable to convert a data packet having any of a plurality of possible packet format types to the pre-defined generic packet format. The method is also operable to convert a data packet having the pre-defined generic packet format to a data packet having any of the plurality of possible packet format types. In the preferred embodiment, the plurality of possible packet format types comprise: TCP/IP, Ethernet, HDLC, ISDN, Lap B, ATM, X.25, Frame Relay, Digital Data Service, FDDI (Fiber Distributed Data Interface), T1, HFC and DSL.

If the packet being converted includes embedded packet data, for example, an Ethernet packet which includes a data field comprising a TCP/IP packet, the method preferably only converts the exterior or outer packet to the generic format, leaving the embedded packet unchanged in the data field. Alternatively, the method converts both the exterior and interior packets to the generic format.

The pre-defined generic packet format comprises a superset of all of the plurality of possible packet format types. The pre-defined generic packet format comprises a type code field. The type code field stores a packet format type of the data packet which was converted to the predefined generic packet format. This type code information is used during the conversion from the pre-defined generic packet format to the second packet format.

The predefined generic packet format preferably also comprises a source address field which stores a source address value, a source address length field which stores information regarding size of the source address value, a destination address field which stores a destination address value, a destination address length field which stores information regarding size of the destination address value, a data field which stores a data value, and a data length field which stores information regarding size of the data.

In another embodiment, the present invention includes a system comprising a plurality of processors which operate to exchange packets in a common format, such as the generic format described above. In this embodiment, the system is operable to include an instruction field comprising instructions within each of the data packets to produce instruction encoded packets. The instruction encoded packets include an instruction field comprising instructions and a data field comprising data.

The system includes a data bus for communicating data and a plurality of processors coupled to the data bus. The data bus is preferably configured in a ring topology, and the instruction encoded packets travel on the data bus configured in the ring topology. Each of the plurality of processors operate to exchange the instruction encoded packets in the common format.

Each of the plurality of processors are operable to include instructions in an instruction field of a packet to create an instruction encoded packet. Each of the plurality of processors are also operable to execute instructions from the instruction field comprised in the instruction encoded packets. Each of the plurality of processors preferably comprise an identical instruction set for executing instructions in the instruction encoded packets. The instructions may direct a processor to perform operations on data comprised in the instruction encoded packets or perform routing operations on the instruction encoded packets.

BRIEF DESCRIPTION OF THE DRAWINGS

A better understanding of the present invention can be obtained when the following detailed description of the preferred embodiment is considered in conjunction with the following drawings, in which:

FIG. 9 illustrates the generic packet format including an instruction field according to another embodiment of the present invention;

DETAILED DESCRIPTION OF THE PREFERRED EMBODIMENT

Figure 1:
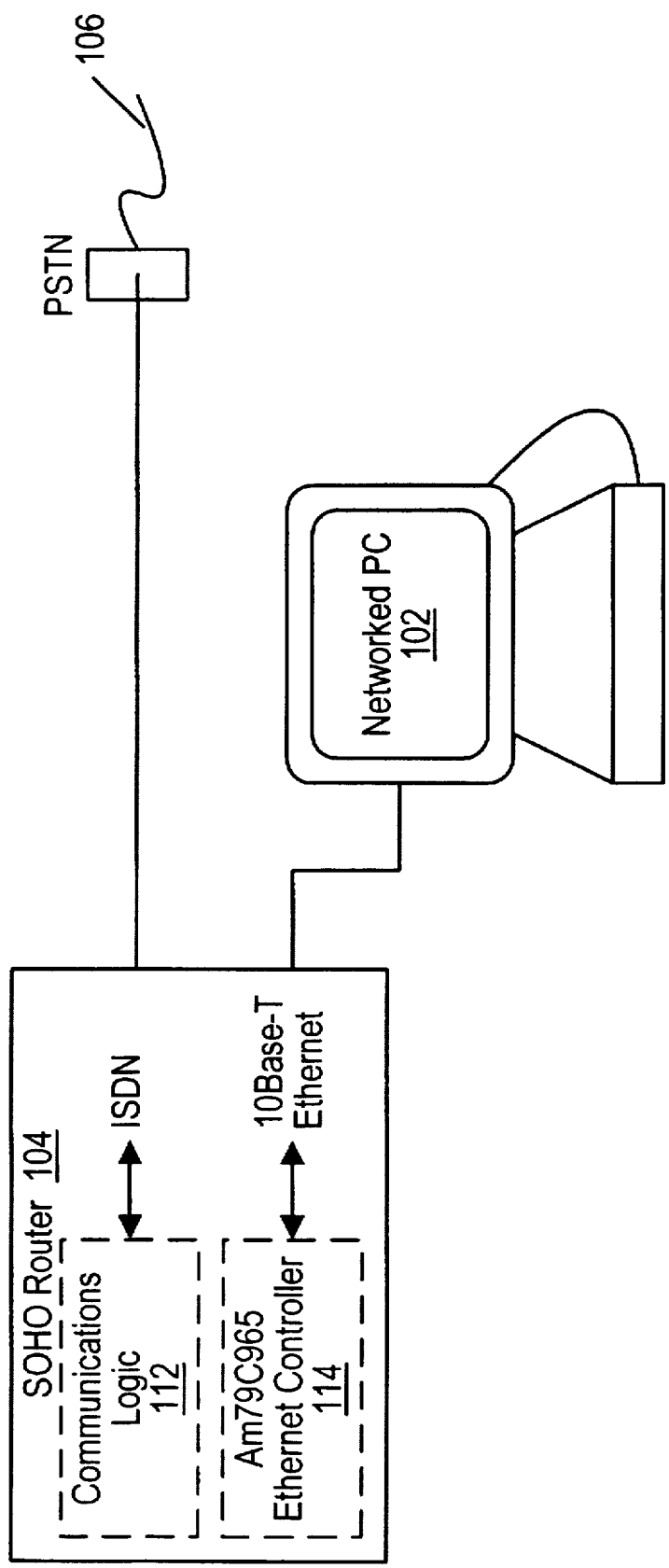
FIG. 1 illustrates a router which interfaces between a local area network and the PSTN and which includes improved packet conversion according to the present invention.

FIG. 1—Communication System

Referring now to FIG. 1, a communication system which incorporates the preferred embodiment of the present invention is shown. FIG. 1 illustrates a router 104 which connects to one or more networked computer systems 102 and which is operable to connect to the public switched telephone network (PSTN) 106. The router 104 includes communication logic 112 which provides more efficient packet conversion according to the present invention. However, it is noted that the present invention may be comprised in other types of communication devices or computer systems, as desired.

As shown, the router 104 interfaces to at least one computer system 102, preferably a networked computer system 102. The at least one networked computer system 102 may be part of a local area network (LAN). The router 104 may be configured to interface to any of various types of computer systems or networks. Thus one or more of the networked computer systems 102 connect through the router 104 to the public switched telephone network (PSTN) 106.

The router 104 operates to route messages across different networks with different topologies. Router 104 also preferably performs gateway functions, i.e., the router includes logic for translating between different protocols. Thus, the router/gateway 104 can provide a link between a local area network represented by networked PC 102, and a completely different network type using a different transfer protocol. This enables, for example, a LAN to connect to a mainframe. More specifically, this allows an ISDN connection to interface to an Ethernet LAN or TCP/IP network, such as a UNIX network or the Internet. Thus, the router/gateway 104 operates at the bottom three layers of the OSI (open systems interconnection) model. As discussed below, the router 104 uses a pre-defined generic packet format to facilitate conversions between different packet formats according to the present invention.

The router 104 may be adapted for connecting to various types of communication media. In the embodiment of FIG. 1, the router connects through the PSTN 106, wherein the PSTN may be standard plain old telephone service (POTS) or the ISDN (integrated services digital network). The router 104 may also be adapted to couple to an ATM (asynchronous transfer mode) network, an FDDI (fiber distributed data interface) network, an X.25 network, a synchronous optical network (SONET), xDSL (Digital Subscriber Line), e.g., ADSL, or other types of communication protocols or media, as desired.

As shown, the router 104 includes communication logic 112. In the preferred embodiment the communication logic 112 presents an ISDN interface for coupling to the PSTN 106. The router 104 also preferably includes an Ethernet controller 114 for coupling to an Ethernet local area network (LAN). As shown, the Ethernet controller 114 is coupled to the communication logic 112. The Ethernet controller 114 couples through a communication media to the local area network, represented by networked computer system 102. In the preferred embodiment, the Ethernet controller 114 is adapted to provide a 10Base-T Ethernet connection.

Figure 2:
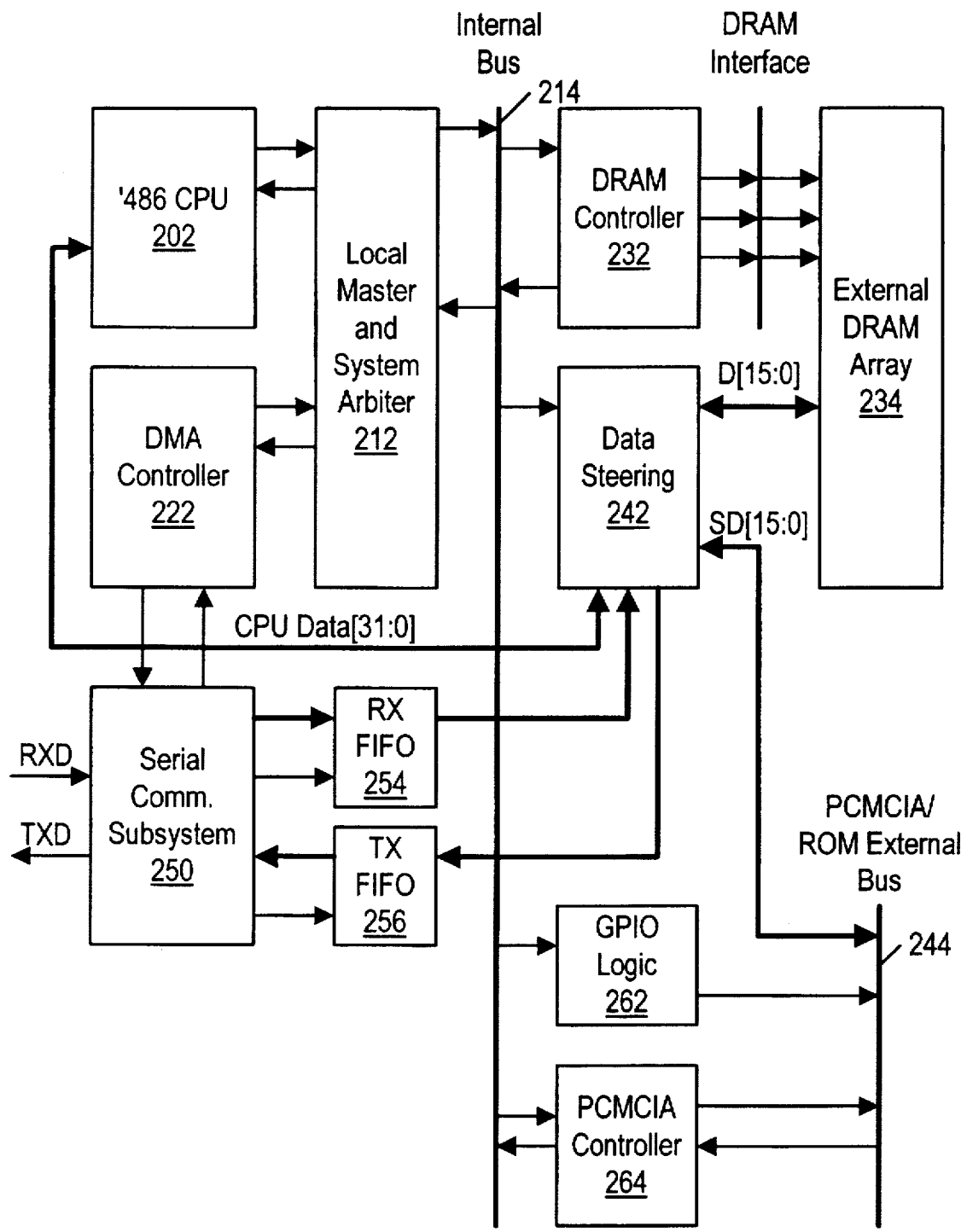
FIG. 2 is a block diagram of communication logic comprised in the router of FIG. 1.

FIG. 2—Communication Logic

Referring now to FIG. 2, a block diagram which illustrates the architecture of the communication logic 112 according to one embodiment of the present invention is shown. The communication logic 112 preferably comprises an embedded communication processing system. The communication logic 112 includes a system and method for performing packet format conversions with improved efficiency according to the present invention.

As shown, the communication logic 112 includes a central processing unit (CPU) 202. The central processing unit 202 preferably includes an internal or external cache system. In the embodiment shown in FIG. 2, the CPU 202 includes an internal or on-chip cache system 204 as shown. In the preferred embodiment, the CPU 202 is a 486 compatible microprocessor such as the AM486 produced by Advanced Micro Devices. Other types of CPUs 202 which include either an internal and/or external cache system may be used as desired.

As shown, the CPU 202 couples to Local Master and System Arbiter logic 212. The Local Master and System Arbiter 212 couples to an internal bus 214, referred herein as the system bus 214. The Local Master and System Arbiter block 212 performs arbitration functions for controlling accessing to the system bus 214. The Local Master and System Arbiter logic 212 also performs bus mastering functions.

A direct memory access (DMA) controller 222 is coupled to the Local Master and System Arbiter logic 212. The DMA controller 222 performs direct memory access operations. Thus, the DMA controller 222 operates through the local master 212 to perform transfers between devices on the system bus 214 without requiring host CPU intervention, i.e., without requiring transfer or set-up operations to be performed by the CPU 202.

The communication logic 112 also preferably includes a memory controller 232 which couples to the system bus 214. The memory controller 232 comprised in the communication logic 112 is adapted for coupling to a memory array 234. As shown, the memory array 234 is preferably a dynamic random access memory (DRAM) memory array. Also, the memory controller 232 is preferably a DRAM controller as shown. The memory array 234 may of course be other types of memory, such as SRAM, EDO RAM, or RAMBUS RAM, among others.

A data steering logic block 242 is also coupled to the system bus 214. The data steering logic 242 couples to a PCMCIA/ROM external bus 244. The external bus 244 provides an interface for PC cards which are compatible with the personal computer memory card internal association (PCMCIA) standard. External bus 244 also provides an interface for ROM (read only memory) as well as other devices. The data steering logic 242 also couples through a data path to the external DRAM array 234. The data steering logic 242 further couples to the CPU 202, as well as to a receive FIFO device (RX FIFO) 254 and a transfer FIFO device (TX FIFO) 256.

The data steering logic 242 operates to provide data manipulation functions and data path transfers to allow each of the devices comprised in the communication system to operate using a single external memory array 234. For more information on the data steering logic 242, please see U.S. patent application Ser. No. 08/837,120, entitled "Computer System with Unified System Memory and Improved Bus Concurrency", filed Apr. 14, 1997, (TT1295/AMD5000-67100), whose inventor is James Mergard, et al. which is hereby incorporated by reference in its entirety.

The communication system includes a serial communication subsystem 250. The serial communication subsystem 250 provides a serial communication interface to external communication media. As discussed above, in the preferred embodiment the router 104 provides an ISDN interface through the PSTN 106. Thus, the serial communication subsystem 250 preferably provides a serial interface for PSTN connectivity. As shown, the serial communication subsystem 250 includes a receive data input (RXD) and a transfer data output (TXD). The serial communication subsystem is coupled to provide receive data to the receive FIFO 254. The receive FIFO 254 in turn provides data to the data steering logic 242. The serial communication subsystem 250 is also coupled to receive data from the transfer FIFO 256. The transfer FIFO 256 is in turn coupled to receive data from the data steering logic 242. In an alternate embodiment, the receive FIFO 254 and transfer FIFO 256 may be coupled directly to the system bus 214.

As shown, the communication system 112 preferably includes general purpose input/output logic (GPIO logic) 262 which couples to the system bus 214, and which also couples to the PCMCIA/ROM External bus 244. The GPIO logic 262 provides general purpose input/output operations between the external bus 244 and the internal bus 214. The system further includes a PCMCIA controller 264 which is also coupled between the system bus 214 and the PCMCIA external bus 244. The PCMCIA controller 264 provides a PCMCIA standard interface for PC card devices.

Figure 3:
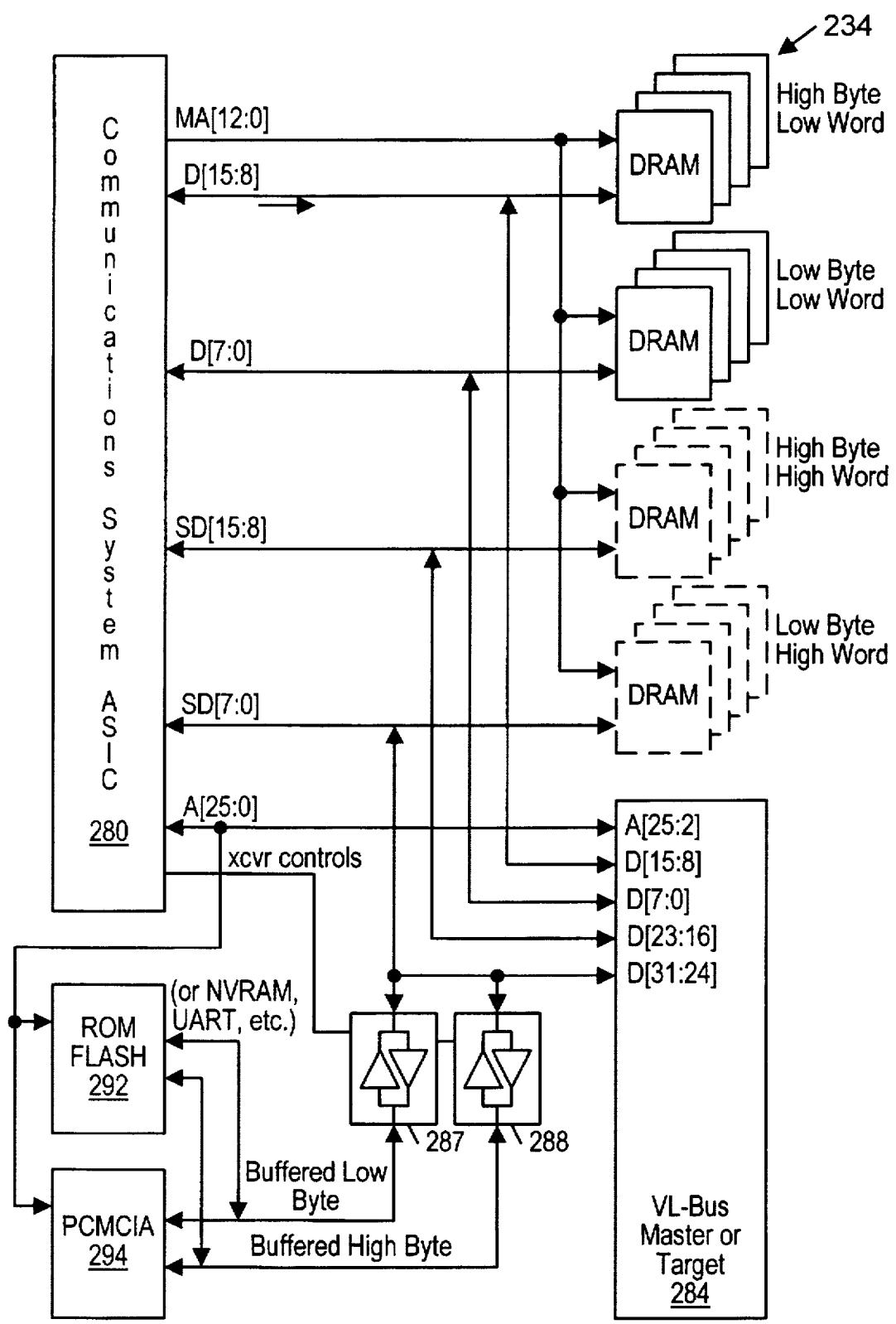
FIG. 3 illustrates the address/data path configuration of the communication system of FIG. 2.
Figure 4:
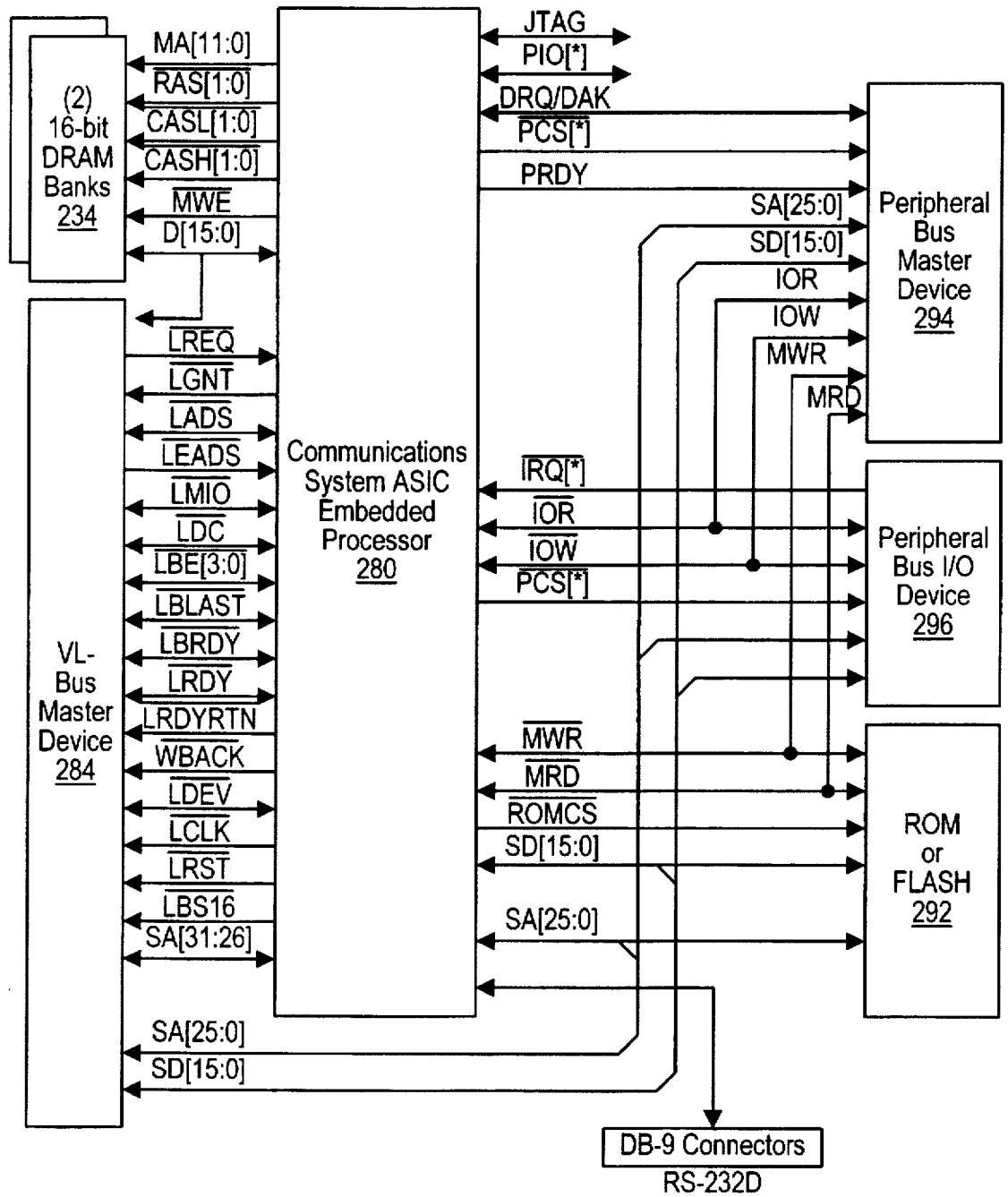
FIG. 4 is a block diagram of the logic devices comprised in the communication system of FIG. 2.

FIGS. 3 and 4—External Address/Data Bus and Control Signal Interface

FIG. 3 illustrates the communication system 112 partitioned according to the various discrete blocks according to the preferred embodiment. As shown, the communication system 112 preferably comprises a system ASIC (application specific integrated circuit) 280. The system ASIC 280 preferably incorporates the CPU 202, the DMA controller 222, the Local Master and System Arbiter logic 212, the system bus 214, the DRAM controller 232, the data steering logic 242, the receive and transfer FIFOs 254 and 256, the serial communication subsystem 250, the GPIO logic 262 and the PCMCIA controller 264. It is noted that the system of FIG. 2 may be implemented in various other ways, such as a plurality of discrete logic blocks or programmable logic, as desired.

As shown, the system ASIC 280 provides various address and data interfaces to the external DRAM array 234. In the embodiment of FIG. 3, the external DRAM array 234 comprises four banks of DRAM memories as shown. These four banks preferably comprise a high byte low word bank, a low byte low word bank, a high byte high word bank, and a low byte high word bank. It is noted that various other types of memory array configurations may be used as desired.

The system ASIC 280 preferably includes a system bus interface for external devices. As shown, the bus master or target device 284 may be coupled to the system ASIC 280. The bus master or target device 284 couples directly to the internal system bus 214 comprised in the communication logic 112. In the preferred embodiment shown in FIG. 1, the bus master or target device 284 comprises the Ethernet controller 114. FIG. 3 also illustrates bus transceivers 287 and 288, which provide the PCMCIA/ROM external bus interface 244. As shown, the external bus 244 is adapted for coupling to a ROM/Flash memory array 292 as well as PCMCIA interface logic 294. Various other devices may be connected to the external bus 244, including non-volatile random access memory (NVRAM) and a universal asynchronous receiver transmitter (UART) (both not shown), among others.

FIG. 4 is a block diagram similar to FIG. 3 which shows the various control signals provided each of the various logic devices of FIG. 3. Thus, FIG. 4 illustrates the system ASIC or embedded processor 280 coupled to the external memory 234, the master device 284, ROM/Flash memory 292, PCMCIA bus master device 294, and peripheral bus I/O device 296. The peripheral bus I/O device 296 may be a universal asynchronous receiver transmitter (UART) or other device. FIG. 4 also illustrates a serial interface provided by the system ASIC or embedded processor 280 as shown.

Operation of the Present Invention

Figure 5A:
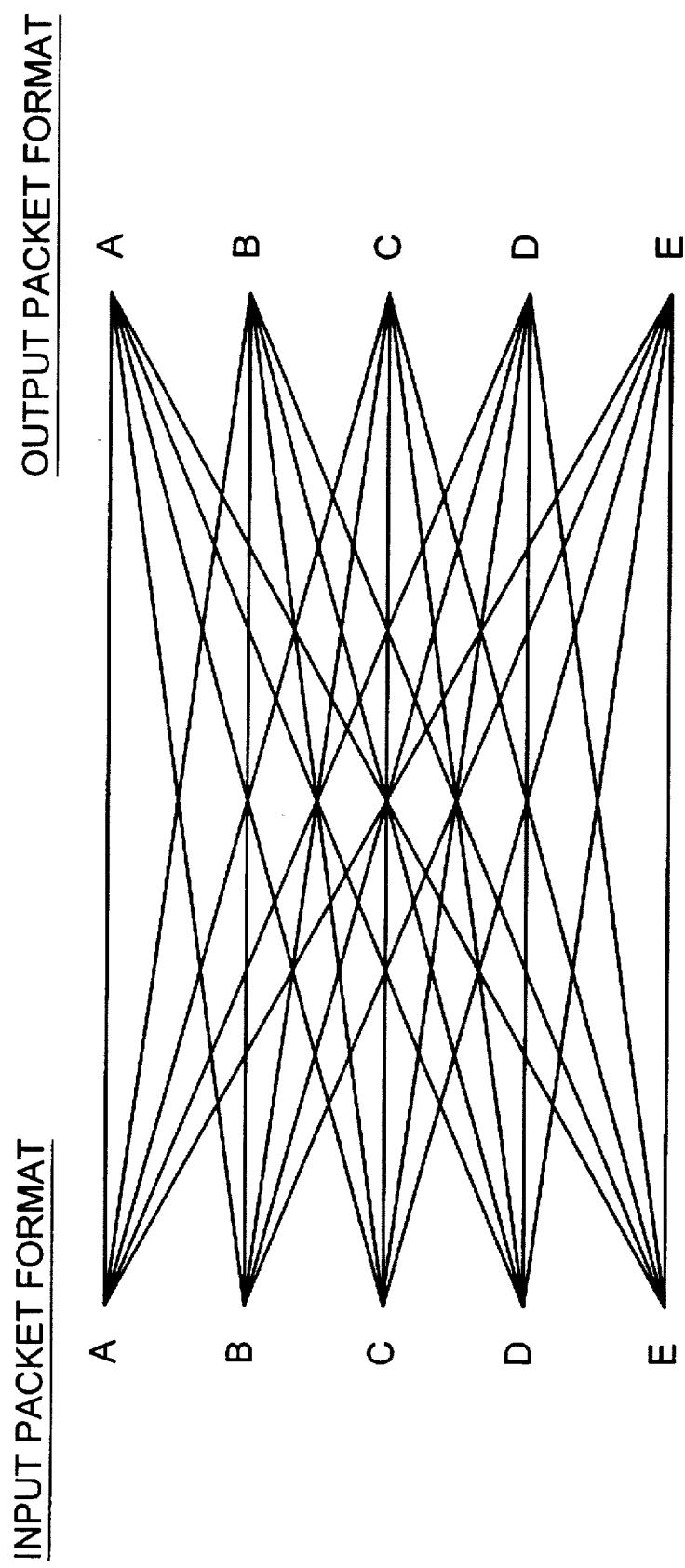
FIG. 5A illustrates prior art packet conversion.

FIG. 5A illustrates prior art packet/frame conversion methods which assume a plurality of input packet formats or types on the left labeled A, B, C, D, E, and a plurality of output packet formats or types also labeled A, B, C, D, E, as shown. As discussed in the background section, prior art methods require dedicated conversion logic or software to perform packet format conversions between each input data packet type or format and each output data packet type or format. Thus, a developer would have to create individual dedicated logic or software modules, one for each combination of input and output packet format conversions.

Figure 5B:
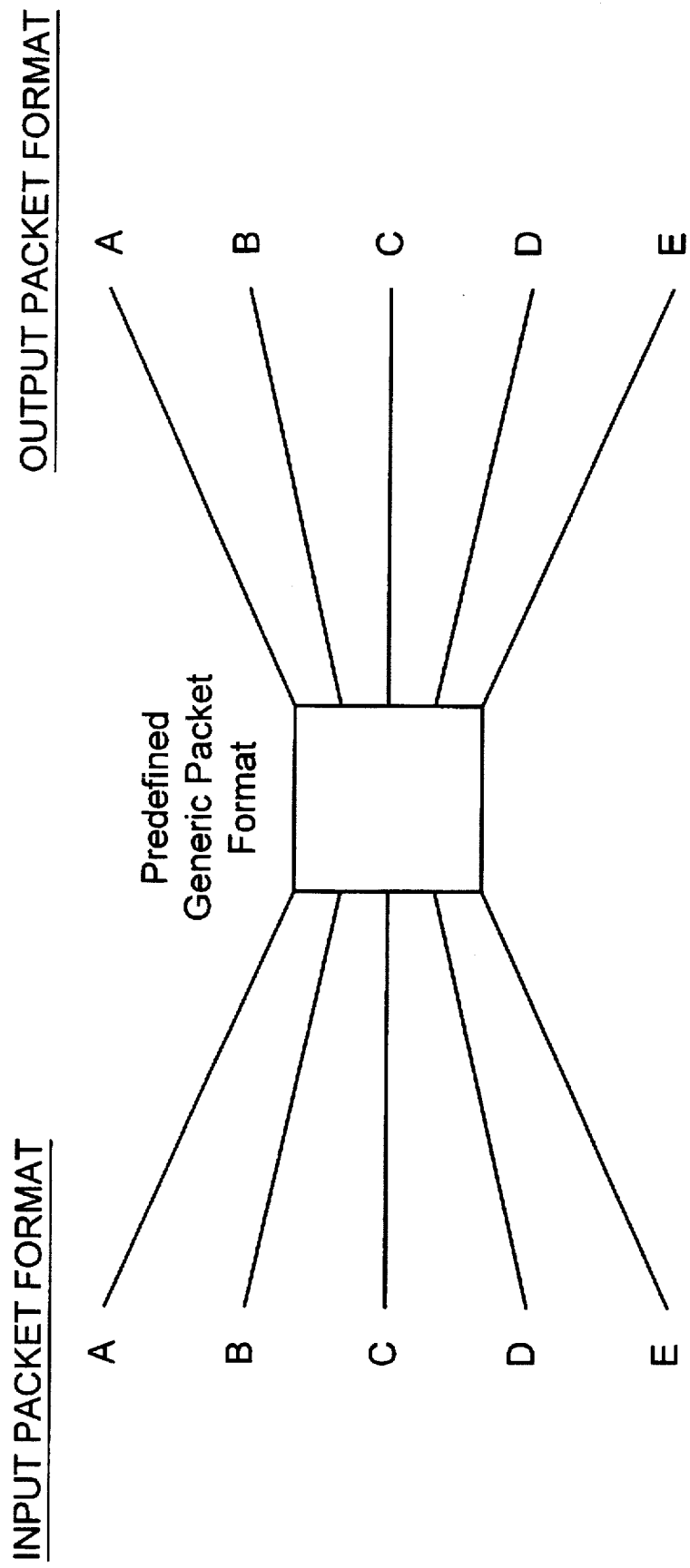
FIG. 5B illustrate packet conversion according to the present invention.

As shown in FIG. 5B, the present invention converts data from any of various different types of input data packet formats to a common pre-defined generic data packet format. Once the data has been converted to this common generic data packet format, the data is then converted to the desired output data packet format as shown. This greatly simplifies the data packet format conversion method and allows simplified conversion for new packet types.

Figure 6:
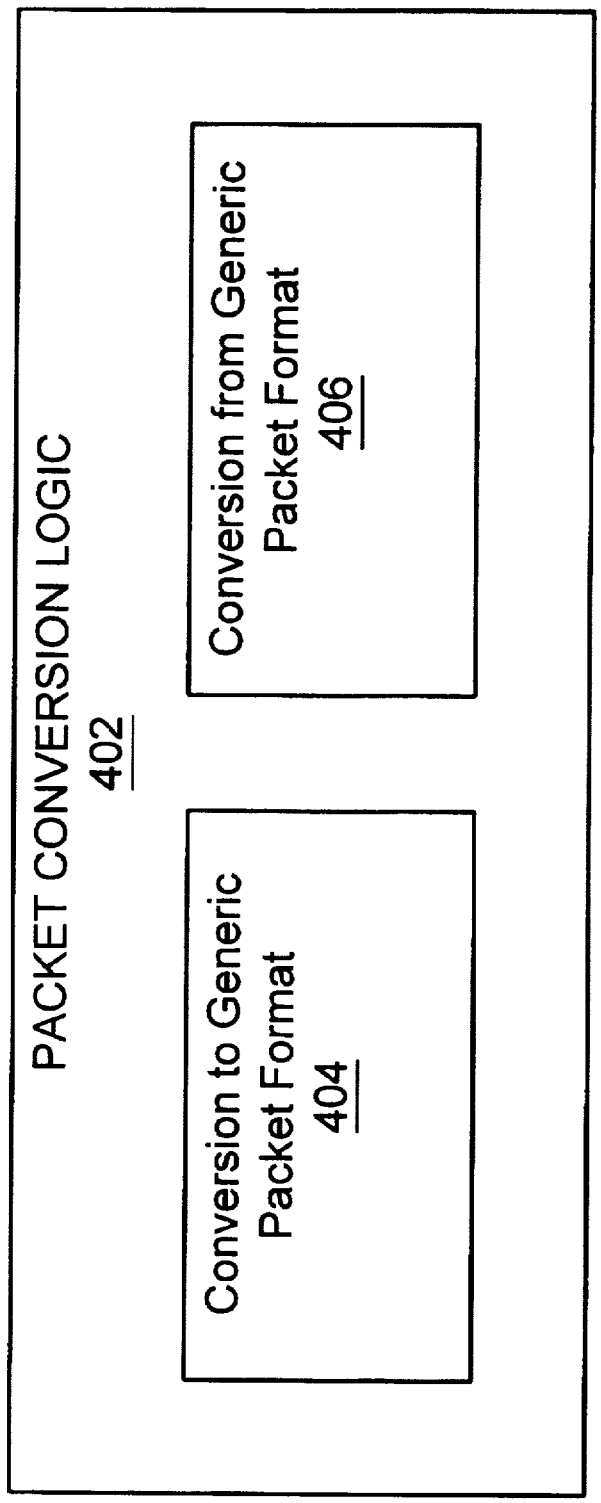
FIG. 6 illustrates packet conversion logic according to one embodiment of the invention.
Figure 7:
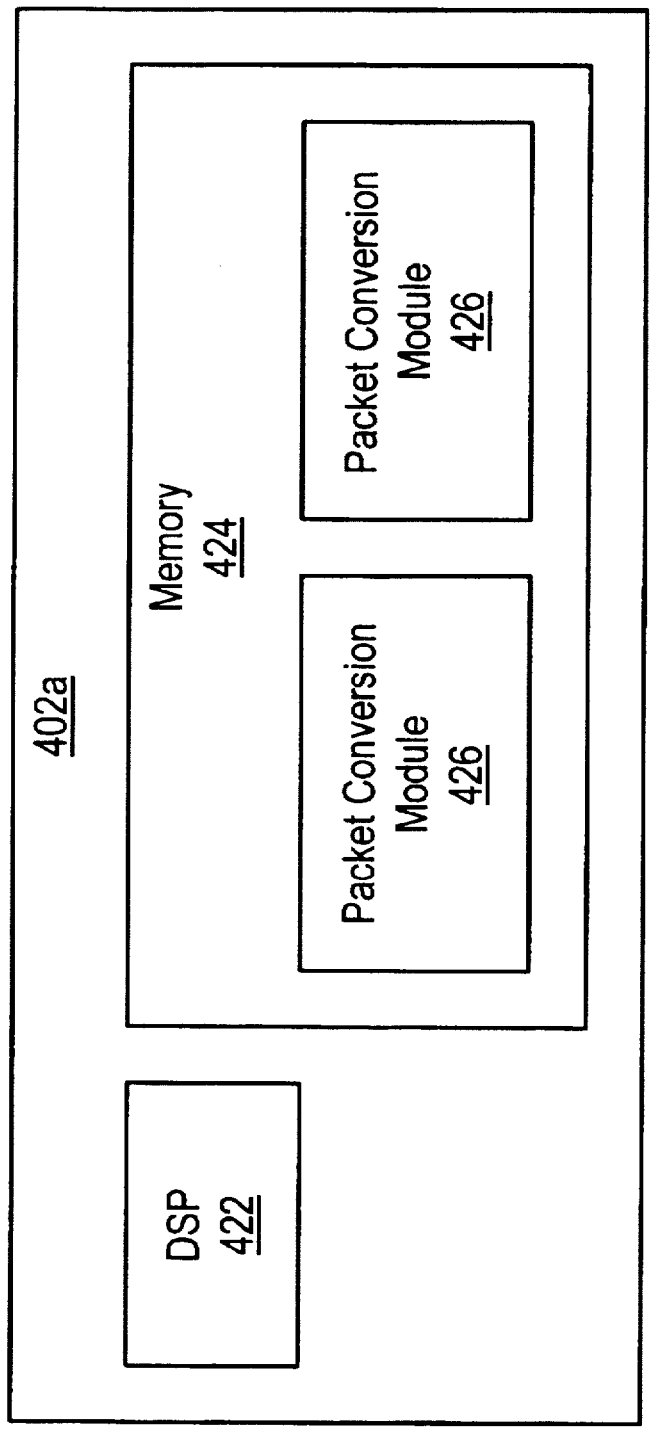
FIG. 7 illustrates packet conversion logic comprising a programmable digital signal processor (DSP) and associated memory.

FIGS. 6 and 7—Packet Conversion Logic

Referring now to FIG. 6, a block diagram illustrating packet conversion logic 402 according to the preferred embodiment of the invention is shown. In the preferred embodiment, the packet conversion logic 402 is comprised in the serial communications subsystem 250. However, it is noted that the packet conversion logic 402 may be comprised in any of various parts of the communications system 112.

The packet conversion logic 402 in the serial communications subsystem 250 includes an input which receives a data packet according to a first packet format or frame format. The packet conversion logic 402 also includes an output which produces a data packet according to a second different packet format or frame format. The packet conversion logic 402 operates to receive a data packet in a first packet format. The received data packet has a first packet format from a plurality of possible packet format types. The packet conversion logic 402 then operates to convert the data packet in the first packet format to a data packet having a predefined generic packet format. The packet conversion logic 402 then operates to convert the data packet having said predefined generic packet format to a data packet having a desired second packet format. The second packet format is one of the plurality of possible packet format types. According to the present invention, the generic packet format is used to convert between different ones of the plurality of possible packet format types.

As shown, in the embodiment of FIG. 6 the packet conversion logic 402 includes a first block 404 which performs conversion of a data packet from any one of a plurality of packet or frame formats to the generic packet format. The packet conversion logic 402 also includes a second block 406 which performs conversion of a data packet in the generic packet format to any one of the plurality of packet or frame formats.

The conversion logic 404 includes an input which receives a data packet in the first packet format and an output which provides the data packet in the generic packet format. The conversion logic 404 in the packet conversion logic 402 operates to convert the data packet in the first format to the generic packet format. The conversion logic 406 includes an input which receives a data packet in the generic packet format and an output which provides the data packet according to a selected one of the plurality of possible packet format types.

In one embodiment, once the data packet has been converted to the generic format, the data packet in the generic format is then provided by an output to the receive FIFO 254 and is processed in the system in this generic packet format. Thus, in this embodiment, the received data packet is immediately converted to the generic packet format and the data is manipulated by the system in this generic packet format. When the system is ready to transmit the data packet to another system using a second different packet format, then the conversion logic 406 in the packet conversion logic 402 operates to convert the data packet from the generic packet format to the second packet format for transmission to the system. Thus, in this embodiment when a data packet having a first packet format type is received, the conversion logic 402 converts this data packet to the generic packet format and the data is manipulated within the system in this generic packet format. When the data packet is ready to be transmitted to another device using a second packet format type, the conversion logic 406 converts the data packet from the generic packet format to the second packet format type. The data in the second packet format type is then output to the respective device.

In an alternate embodiment of the present invention, the received data packet in the first packet format type is manipulated in the system in the first packet format type and is converted to the generic packet format and then to the second packet format just prior to transmission. Alternatively, the received data packet in the first packet format is converted to the generic packet format and then from the generic packet format to the second packet format, and the data packet in the second packet format type is manipulated within the communications system.

In the embodiment shown in FIG. 6, the packet conversion logic 402 comprises discrete logic. In the preferred embodiment of the invention, as shown in FIG. 7, the packet conversion logic 402 comprises a programmable digital signal processor (DSP) 422 and associated memory 424. The DSP 422 performs the packet conversions to and from the generic packet format by executing software instructions from the memory 424. As shown, the memory 424 is operable to store one or more packet conversion modules 426. Each of the packet conversion modules 426 include software for converting from/to a selected packet or frame type format to/from the generic packet format.

The packet conversion logic 402 is operable to convert between a plurality of different possible packet formats. Thus the packet conversion logic 402 is operable to convert between each of these plurality of packet formats to/from the generic packet format. In the preferred embodiment, the plurality of possible packet format types comprise: TCP/IP (Transfer Control Protocol/Internet Protocol), Ethernet, HDLC, ISDN (Integrated Services Digital Network), LapB, LapM, ATM (Asynchronous Transfer Mode), X.25, Frame Relay, Digital Data Service, FDDI (Fiber Distributed Data Interface), T1, HFC (Hybrid Fiber Coax), SONET (Synchronous Optical Network) and Digital Subscriber Line (DSL). The term "Digital Subscriber Line" is intended to include ADSL (Asymmetric Digital Subscriber Line), SDSL (Symmetric Digital Subscriber Line), and HDSL (High bit-rate Digital Subscriber Line), as well as other subscriber line techniques.

The generic packet format of the present invention simplifies the development process when conversion is desired between existing packet format types and a new packet format type. In prior art systems, conversion modules or logic would be necessary to convert between each of the existing packet format types and the new packet format type. According to the present invention, conversion modules or logic are only necessary between the new packet format type to/from the generic packet format. Once the new packet format type has been converted to the generic packet format, a number of modules already exist for converting from the generic packet format to each of the existing packet format types. Likewise, a number of modules already exist for converting from each of the existing packet format types to the generic packet format. Once an existing packet format type has been converted to the generic packet format, the generic packet format can then be converted to the new packet format type.

In many instances, a second packet format is embedded or comprised as the payload in a first packet format. For example, a TCP/IP packet is commonly comprised as the payload in an Ethernet packet. In the preferred embodiment, when a second packet format is embedded or comprised as the payload in a first packet format, the packet conversion logic 402 operates to convert the exterior or first packet format to/from the generic packet format, and leave the interior or second packet format unchanged as the payload of the newly created generic packet. Alternatively, the packet conversion logic 402 operates to convert both the exterior or first packet format and the interior or second packet format to/from the generic packet format.

Figure 8:
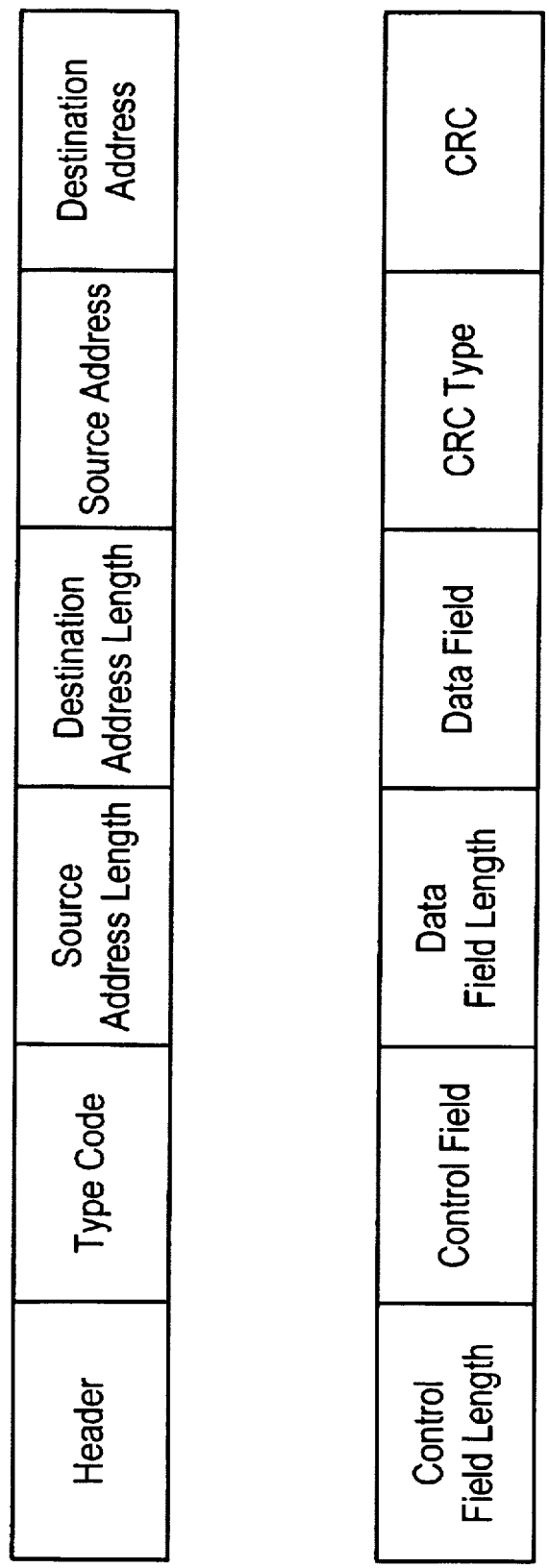
FIG. 8 illustrates the generic packet format according to the preferred embodiment of the present invention.

FIG. 8—Generic Packet Format

Referring now to FIG. 8, a diagram illustrating the generic packet format according to the preferred embodiment of the invention is shown. As shown, the generic packet format preferably comprises a header field, a type code field, a source address length field, a destination address length field, a source address field, a destination address field, a control field length, a control field, a data field length, a data field, a CRC (cyclic redundancy check) type field and a CRC field.

Each of the type and length codes or fields allow different address length, data length and control field types to be included within the packet format. Thus, each of the source address length and destination address length fields provide information on the length or size, i.e., the number of bytes, comprised in the source address field and the destination address field, respectively. Likewise, the control field length comprises information regarding the number of bytes of the subsequent control field. In a similar manner, the data field length comprises information on the number of bytes comprised in the data field portion. When the type code or length field comprises the number 0, this indicates that the subsequent or corresponding field is vacant and not used. Thus, if the control field length is 0, then the control field is vacant or unused.

The type code field comprises information identifying the packet format type of the data packet which was converted to said predefined generic packet format. In other words, if the packet conversion logic 402 converts a data packet from a first packet format to a second packet format, the type code field identifies the first packet format from which the data packet was converted from. This information is provided in the generic packet because it may be useful in the conversion process from the generic packet format to a second packet format.

The control field stores various control information or control field data, such as one or more of error status, sequence number, channel and/or time slot identification, call progress, abort status, message status, and reset and initialization commands, among others.

It is noted that the generic packet format shown in FIG. 8 is illustrative only, and other types of generic or intermediate data packet formats can be used according to the present invention.

The intermediate or generic packet format used according to the present invention enables direct transmittal of frame/packet data between two or more communication controllers supporting different packet/frame formats. This allows, for example, a received data packet conforming to the TCP/IP packet format to be received, converted to the generic packet format, and then be converted to any of various other types of packet formats, such as ISDN or Ethernet. Likewise, the present invention allows any of various types of received data packet formats to be easily converted to any of various output data packet formats. The present invention further simplifies the development of packet conversion modules.

As mentioned above, the use of the generic packet format obviates the necessity the programmer or developer having to develop hardware and/or software to convert between each of the respective input data packet formats and each of the respective output data packet formats. However, using the generic data packet format of the present invention, conversion modules or hardware can be developed to convert from each of the respective data packet formats to the generic packet format, and likewise to convert from the generic data packet format to each of the plurality of the respective data packet formats. This greatly simplifies the process of creating hardware and/or software for converting between different data packet formats.

FIG. 9—Generic Packet Format with Instruction Field

The generic packet format of the present invention can be used to provide a single internal packet format for unified routing within the communications system 112. Referring now to FIG. 9, in one embodiment of the invention the generic packet format includes an instruction field for storing instructions or a subroutine. The instructions are used within the communications system 112 to operate on the data comprised in the generic packet. The incorporation of an instruction field within the generic packet format provides a convenient mechanism for attaching instructions to a data packet. This provides for simplified routing of data and corresponding instructions within the communication system.

Figure 10:
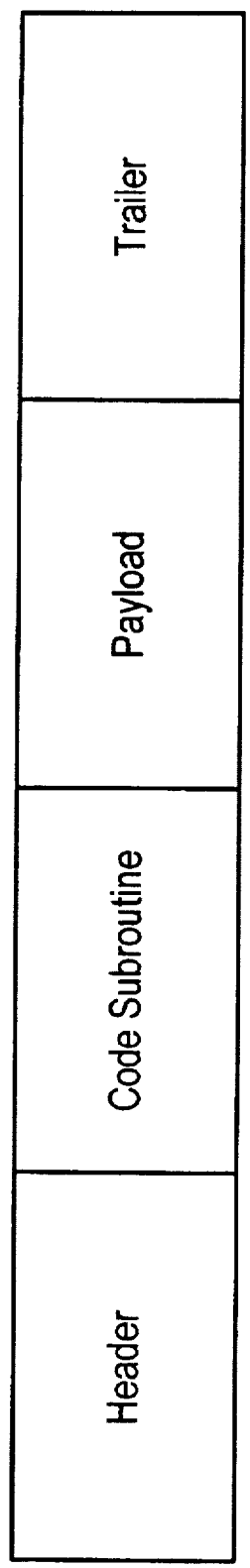
FIG. 10 illustrates an instruction encoded packet including a packet wrapper for unified routing, wherein the instruction encoded packet includes an instruction field.

FIG. 10—Packet Wrapper for Unified Routing Architecture

In another embodiment of the invention, the communications system 112 operates to provide a separate packet wrapper around received packet data to provide for unified routing within the communications system 112. This embodiment operates to place a packet wrapper around the received packet data, wherein the packet wrapper comprises a variable length field storing code or instructions which are used during the routing process. As shown in FIG. 9, the instruction packet wrapper comprises a header followed by a code subroutine which is then followed by the payload, i.e. the original data packet, and a trailer. Thus, the received data packet, referred to as the payload, is enveloped or wrapped with a data packet wrapper comprising the header, code subroutine and trailer. The payload may comprise the data packet received or a data packet to be transmitted. Alternatively, the payload may also comprise a data packet which has already been converted to the generic packet format as described above. In the present disclosure, a packet which includes an instruction field is referred to as an instruction encoded packet or a "smart" packet.

Figure 11:
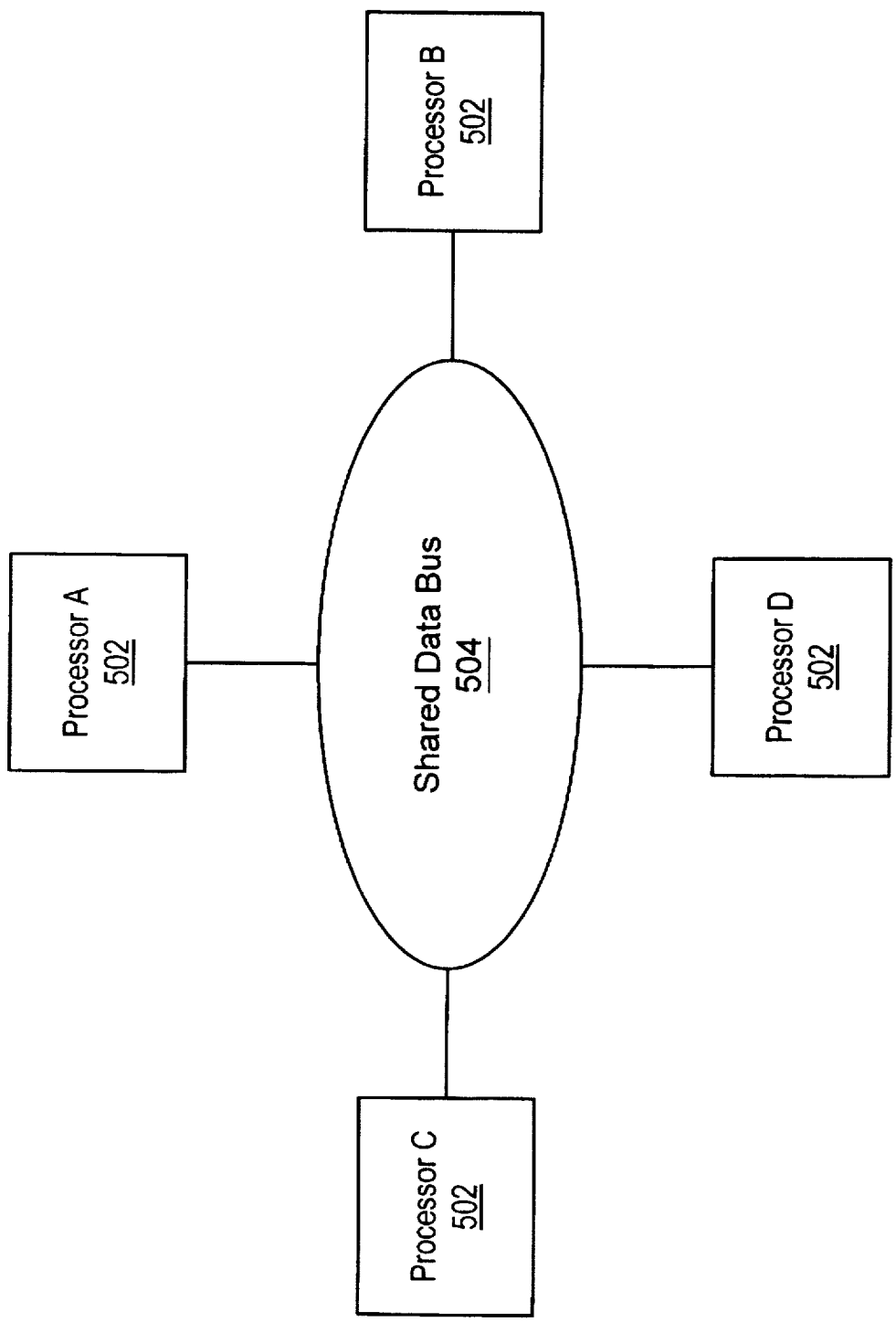
FIG. 11 illustrates a processor architecture including a plurality of processors which share instruction encoded packets in a common format.

FIG. 11—Microcontroller Architecture

Referring now to FIG. 11, a block diagram illustrating a plurality of processors 502 exchanging instruction encoded packets according to the present invention is shown. The processors 502 may be any of various types of processing logic, including one or more CPUs, microcontrollers, or other processing logic.

The plurality of processors 502 are connected to a common data bus. FIG. 11 illustrates a plurality of processors or microcontrollers 502 configured in a "ring" format. The microcontrollers 502 are physically configured in a ring topology, wherein the ring comprises a shared data bus 512 to which each of the microcontrollers 502 are connected. The instruction encoded packets are passed among the various processors 502 on the "ring" data bus.

The instruction encoded packets preferably all have a common format. In the preferred embodiment, each of the plurality of microcontrollers 502 are identical, and each uses an identical instruction set. The microcontrollers 502 operate to exchange the data packets in the common format.

As discussed above, the data packets comprise a variable length instruction field where instruction code or subroutines are preferably stored. The instructions comprised in the instruction encoded packet may be used to perform operations on data comprised in the instruction encoded packets. The instructions comprised in the instruction encoded packet may also be used to perform routing operations on the instruction encoded packets. The instructions comprised in the instruction encoded packet may have perform other operations, as desired.

The system shown in FIG. 11 preferably includes logic adapted to receive input data packets. The logic is operable to include an instruction field comprising instructions within the one or more input data packets to produce instruction encoded packets. The instruction encoded packets include an instruction field comprising instructions and a data field comprising data. As mentioned above, the processors 502 are operable to exchange the instruction encoded packets and to execute instructions from the instruction field comprised in the instruction encoded packets.

The embedded code comprised within the instruction encoded or "smart" packet may be written by one microcontroller and executed by a second microcontroller to perform operations on the packet data. Thus, the original data packet is received by a first microcontroller, and the first microcontroller operates to wrap the packet with the instruction wrapper which includes the code subroutine. This "smart" packet may then be transferred to a second microcontroller, which operates to execute the code subroutine comprised in the instruction encoded packet.

The instructions or code subroutine comprised in the instruction encoded packet may perform various operations on the data comprised in the instruction encoded packet. For example, the instructions may direct a microcontroller 502 to perform operations on the payload or to route the smart packet in a certain manner, or perform a desired error correction routine, or other operations.

Figure 12:
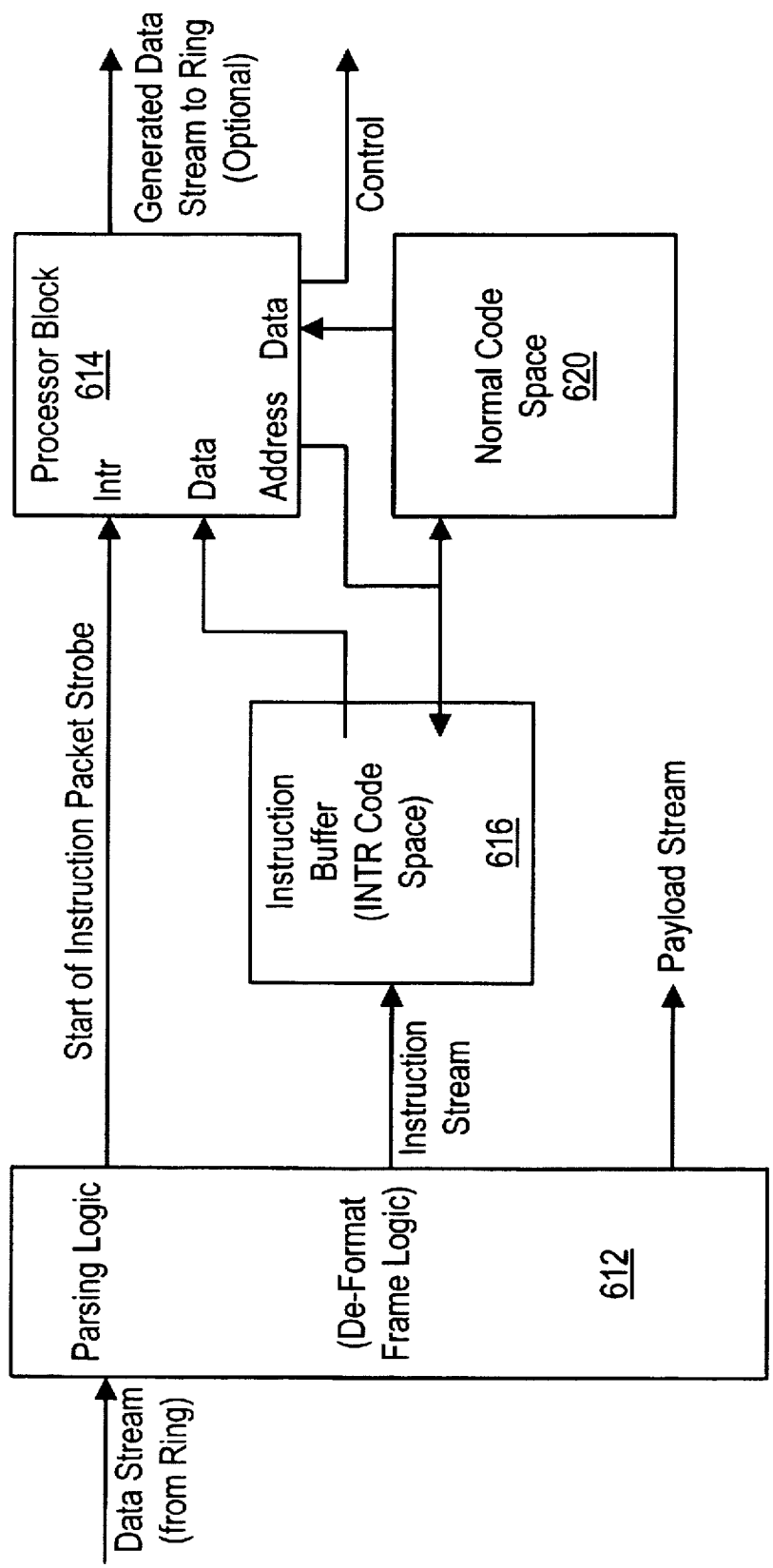
FIG. 12 is a block diagram illustrating one of the processors of FIG. 11.

FIG. 12—Microcontroller Block Diagram

Referring now to FIG. 12, a block diagram illustrating one of the microcontrollers 502 comprised in the system of FIG. 11 is shown. As shown, each of the microcontrollers 502 comprises parsing logic 612, also referred to as de-format logic 612, an instruction buffer 616, a processor block 614, and a normal code space memory 620.

The parsing logic or de-format logic 612 receives the data stream comprising one or more instruction encoded packets according to the present invention. The instruction encoded packets may comprise a packet in the generic packet format which includes an instruction field, as shown in FIG. 9. The instruction encoded packets may be generalized as including an instruction field and a data payload as shown in FIG. 10, wherein the data payload may be in the generic packet format or other packet formats, as desired.

As shown, the logic block 612 outputs a strobe signal indicating the start of the instruction packet to a processor block 614. The start of instruction packet strobe which is provided to the microcontroller 614 is provided to the interrupt input (intr) of the processor block 614. The logic block 612 operates to parse or de-format the frame, i.e. to strip off the instruction or code subroutine field from the payload. The logic block 612 outputs an instruction stream comprising the instruction or code subroutine to an instruction buffer 616 as shown. The instruction buffer 616 is coupled to provide instruction data to the processor block 614. The logic block 612 also outputs the payload stream, as shown.

The processor block 614 is coupled to provide an address output to each of the instruction buffer 616 and the normal code space memory 620. In response to a received address, the instruction buffer 616 operates to provide instruction data comprising the encoded instructions to the processor block 614. The processor block 614 thus receives the instructions from the instruction buffer 616 and executes these instructions to perform the desired operations. As discussed above, these instructions may direct the processor block 614 to manipulate the data or route the packet in a certain manner, as desired. The processor block 614 may also add additional instructions for use by another processor 602. The normal code space memory 620 stores code and data used by the processor block 614.

The processor block 614 outputs a data stream back onto the ring or shared data bus 512 as shown. The processor block 614 preferably outputs data in the common instruction encoded format. Processor block 614 also provides output control signals as shown.

Therefore, in this embodiment, the present invention formulates received packet data into a common format comprising an instruction field. The instruction field is usable by one or more of a plurality of microcontrollers 502 for performing operations on the packet or on the data comprised within the packet. The present invention thus provides a simplified or convenient mechanism for embedding instruction or code subroutines within received packet data.

Conclusion

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

I claim:

1. A system for manipulating data packets comprising:

logic adapted to receive one or more input data packets, wherein the logic is operable to include a non-routing instruction field comprising non-routing instructions within the one or more input data packets to produce instruction encoded packets, wherein said instruction encoded packets include said non-routing instruction field comprising non-routing instructions and a data field comprising data;

a data bus for communicating data;

one or more processors coupled to the data bus, wherein said one or more processors comprise:

parsing logic including an input coupled to receive an instruction encoded packet, wherein said parsing logic operates to extract said non-routing instructions from said non-routing instruction field comprised in said instruction encoded packet and output said non-routing instructions;

an instruction buffer coupled to receive said non-routing instructions from said parsing logic;

a processor block coupled to the instruction buffer which is operable to read said non-routing instructions from said instruction buffer and execute said non-routing instructions to operate on said data comprised in said instruction encoded packet, and wherein each of the one or more processors operate to exchange said instruction encoded packets, wherein the one or more of the processors are operable to execute instructions from said instruction field comprised in said instruction encoded packets.

2. The system of claim 1, wherein the one or more processors are operable to execute instructions from said non-routing instruction field comprised in said instruction encoded packets to perform operations on data comprised in said instruction encoded packets.

3. The system of claim 1, wherein said instruction encoded packets have a common format, wherein said one or more processors comprise a plurality of processors, wherein each of the plurality of processors comprise an identical instruction set for operating on said instruction encoded packets.

4. The system of claim 1, wherein said one or more processors comprise a plurality of processors, wherein the logic operable to include said non-routing instruction field comprising said non-routing instructions within the one or more input data packets to produce instruction encoded packets comprises one or more of said plurality of processors.

5. The system of claim 4, wherein a first processor of said plurality of processor is operable to embed said non-routing instructions in one of said input data packets to produce said instruction encoded packets, wherein a second processor of said plurality of processors is operable to read said embedded non-routing instructions in said instruction encoded packets and to execute said non-routing instructions in said instruction encoded packets to perform operations on the packet data comprised in the instruction encoded packets.

6. The system of claim 1, wherein said one or more processors comprise a plurality of processors, wherein said data bus is configured in a ring topology; wherein said instruction encoded packets travel on said data bus configured in said ring topology.

7. The system of claim 1, wherein said parsing logic further generates a strobe signal indicating the start of the non-routing instructions output from the parsing logic, wherein said strobe signal is provided to an input of said processor block, wherein said processor block is configured to read said non-routing instructions from said instruction buffer in response to receiving said strobe signal.

8. A system for manipulating data packets comprising:
a data bus for communicating data;
a plurality of processors coupled to the data bus, wherein at least one of the processors is operable to receive one or more input data packets, wherein the at least one of the processors is operable to include a non-routing instruction field comprising non-routing instructions within the one or more input data packets to produce instruction encoded packets, wherein said instruction encoded packets include a non-routing instruction field comprising non-routing instructions and a data field comprising data, wherein each of the plurality of processors are operable to exchange said instruction encoded packets, wherein each of the plurality of processors are operable to execute instructions from said non-routing instruction field comprised in said instruction encoded packets; and
wherein said plurality of processors each comprise:
parsing logic including an input coupled to receive an instruction encoded packet, wherein said parsing logic operates to extract said non-routing instructions from said non-routing instruction field comprised in said instruction encoded packet and output said non-routing instructions;
an instruction buffer coupled to receive said non-routing instructions from said parsing logic; and
a processor block coupled to the instruction buffer which is operable to read said non-routing instructions from said instruction buffer and execute said non-routing instructions to operate on said data comprised in said instruction encoded packet.

9. The system of claim 8, wherein the plurality of processors are operable to execute instructions from said non-routing instruction field comprised in said instruction encoded packets to perform operations on data comprised in said instruction encoded packets.

10. The system of claim 8, wherein said instruction encoded packets have a common format, wherein each of the plurality of processors comprise an identical instruction set for operating on said instruction encoded packets.

11. The system of claim 8, wherein the logic operable to include said non-routing instruction field comprising said non-routing instructions within the one or more input data packets to produce said instruction encoded packets comprises one or more of said plurality of processors.

12. The system of claim 11, wherein a first processor of said plurality of processors is operable to embed non-routing instructions in one of said input data packets to produce instruction encoded packets, wherein a second processor of said plurality of processors is operable to read said embedded non-routing instructions in said instruction encoded packets and to execute said non-routing instructions in said instruction encoded packets to perform operations on the packet data comprised in the instruction encoded packets.

13. The system of claim 8, wherein said data bus is configured in a ring topology; wherein said instruction encoded packets travel on said data bus configured in said ring topology.

14. The system of claim 8, wherein said parsing logic further generates a strobe signal indicating the start of the instructions output from the parsing logic, wherein said strobe signal is provided to an input of said processor block, wherein said processor block is configured to read said non-routing instructions from said instruction buffer in response to receiving said strobe signal.

15. The system of claim 8, wherein said system comprises a router for routing data packets between networks.

16. The system of claim 1, wherein the one or more processors are operable to execute instructions from said instruction field comprised in said instruction encoded packets to perform routing operations on said instruction encoded packets.

17. The system of claim 8, wherein the plurality of processors are operable to execute instructions from said instruction field comprised in said instruction encoded packets to perform routing operations on said instruction encoded packets.

18. A system for manipulating data packets comprising:
logic adapted to receive one or more input data packets, wherein the logic is operable to include a non-routing instruction field comprising non-routing instructions within the one or more input data packets to produce instruction encoded packets, wherein said instruction encoded packets include said non-routing instruction field comprising non-routing instructions and a data field comprising data;
a data bus for communicating data;
one or more processors coupled to the data bus, wherein said one or more processors comprise:
parsing logic including an input coupled to receive an instruction encoded packet, wherein said parsing logic operates to extract said non-routing instructions from said non-routing instruction field comprised in said instruction encoded packet and output said non-routing instructions, wherein said parsing logic operates to extract said data from said data field comprised in said instruction encoded packet and output said instructions;

an instruction buffer coupled to receive said non-routing instructions from said parsing logic;

a processor block coupled to the instruction buffer which is operable to read said non-routing instructions from said instruction buffer and execute said non-routing instructions to operate on said data output from said parsing logic, and wherein each of the one or more processors operate to exchange said instruction encoded packets, wherein the one or more of the processors are operable to execute instructions from said instruction field comprised in said instruction encoded packets.

19. The system of claim 18, wherein the one or more processors are operable to execute instructions from said non-routing instruction field comprised in said instruction encoded packets to perform operations on data comprised in said instruction encoded packets.

20. The system of claim 18, wherein the one or more processors are operable to execute instructions from said instruction field comprised in said instruction encoded packets to perform routing operations on said instruction encoded packets.

21. The system of claim 18, wherein said instruction encoded packets have a common format, wherein said one or more processors comprise a plurality of processors, wherein each of the plurality of processors comprise an identical instruction set for operating on said instruction encoded packets.

22. The system of claim 18, wherein said one or more processors comprise a plurality of processors, wherein the logic operable to include said non-routing instruction field comprising said non-routing instructions within the one or more input data packets to produce instruction encoded packets comprises one or more of said plurality of processors.

23. The system of claim 22, wherein a first processor of said plurality of processor is operable to embed said non-routing instructions in one of said input data packets to produce said instruction encoded packets, wherein a second processor of said plurality of processors is operable to read said embedded non-routing instructions in said instruction encoded packets and to execute said non-routing instructions in said instruction encoded packets to perform operations on the packet data comprised in the instruction encoded packets.

24. The system of claim 18, wherein said one or more processors comprise a plurality of processors, wherein said data bus is configured in a ring topology; wherein said instruction encoded packets travel on said data bus configured in said ring topology.

25. The system of claim 18, wherein said parsing logic further generates a strobe signal indicating the start of the non-routing instructions output from the parsing logic, wherein said strobe signal is provided to an input of said processor block, wherein said processor block is configured to read said non-routing instructions from said instruction buffer in response to receiving said strobe signal.

* * * * *

UNITED STATES PATENT AND TRADEMARK OFFICE
CERTIFICATE OF CORRECTION

PATENT NO. : 5,896,383

DATED : April 20, 1999

INVENTOR(S) : Carl Wakeland

It is certified that error appears in the above-identified patent and that said Letters Patent is hereby corrected as shown below:

Claim 21, col. 15, line 27, please delete "onsaid" and substitute --on said--.

Signed and Sealed this

Seventh Day of September, 1999

Attest:

Q. TODD DICKINSON

Attesting Officer  Acting Commissioner of Patents and Trademarks